(12) United States Patent
Yano

(10) Patent No.: US 8,620,161 B2
(45) Date of Patent: Dec. 31, 2013

(54) WAVELENGTH MULTIPLEXING UNIT AND WAVELENGTH MULTIPLEXING METHOD OF WAVELENGTH MULTIPLEXING OPTICAL TRANSMISSION SYSTEM

(75) Inventor: Yutaka Yano, Tokyo (JP)

(73) Assignee: NEC Corporation, Tokyo (JP)

( * ) Notice: Subject to any disclaimer, the term of this patent is extended or adjusted under 35 U.S.C. 154(b) by 83 days.

(21) Appl. No.: 13/221,589

(22) Filed: Aug. 30, 2011

(65) Prior Publication Data

US 2012/0051750 A1    Mar. 1, 2012

(30) Foreign Application Priority Data

Aug. 31, 2010   (JP) .................................. 2010-193528

(51) Int. Cl.
  *H04J 14/02*   (2006.01)
(52) U.S. Cl.
  USPC .......................................................... 398/91
(58) Field of Classification Search
  USPC .............................................. 398/82, 91, 92
  See application file for complete search history.

(56) References Cited

U.S. PATENT DOCUMENTS 7,110,671 B1 *   9/2006   Islam ............................... 398/51

FOREIGN PATENT DOCUMENTS

| JP | 2874439 B | 3/1999 |
| JP | 2001296418 A | 10/2001 |
| JP | 2002122747 A | 4/2002 |
| JP | 2008227556 A | 9/2008 |
| JP | 2010054624 A | 3/2010 |

\* cited by examiner

*Primary Examiner* — Leslie Pascal

(57) ABSTRACT

When using a wavelength multiplexing unit of a wavelength multiplexing optical transmission system in which a wavelength tunable type optical transmitter and a wavelength multiplexer having no wavelength selectivity are combined, undesired light that is not supposed to be flown into a wavelength channel may be mixed therein. A wavelength multiplexing unit includes: transmitters having functions of outputting signal lights of different wavelengths from each other and changing the wavelengths; band-limiting filters provided to each of the transmitters, which have functions of eliminating the lights out of bands from the signal lights outputted from the transmitters, and changing the center wavelengths of the bands; and a wavelength multiplexer including ports capable of inputting the lights of any wavelengths, which inputs signal lights from which the light out of the bands is eliminated by the band-limiting filters and multiplexes the signal lights.

8 Claims, 8 Drawing Sheets

WAVELENGTH MULTIPLEXING UNIT AND WAVELENGTH MULTIPLEXING METHOD OF WAVELENGTH MULTIPLEXING OPTICAL TRANSMISSION SYSTEM

CROSS-REFERENCE TO RELATED APPLICATION

This application is based upon and claims the benefit of priority from Japanese patent application No. 2010-193528, filed on Aug. 31, 2010, the disclosure of which is incorporated herein in its entirety by reference.

BACKGROUND OF THE INVENTION

1. Field of the Invention

The present invention relates to a wavelength multiplexing unit and a wavelength multiplexing method of a wavelength multiplexing optical transmission system used in optical communications.

2. Description of the Related Art

FIG. 8 is a block diagram showing a wavelength multiplexing unit of a wavelength multiplexing optical transmission system according to a related technique. Explanations will be provided by referring to the drawing.

A wavelength multiplexing unit 90 of a wavelength multiplexing optical transmission system includes: a plurality of transmitters 921 to 92n for outputting signal lights 911 to 91n of different wavelengths from each other; and a wavelength multiplexer 94 for multiplexing the signal lights 911 to 91n outputted from the transmitters 921 to 92n. The transmitters 921 to 92n are connected to ports (connecting ports) 951 to 95n of the wavelength multiplexer 94. The wavelength multiplexer 94 outputs a wavelength multiplexed light 93 by multiplexing the signal lights 911 to 91n. In FIG. 8, λ means a wavelength.

In a general wavelength multiplexing (frequency division multiplexing) optical transmission system, a wavelength (frequency) band is allotted to each channel. Leak light out of the band is a disturbance to other channels, so that it is desired to be avoided as much as possible. The wavelength multiplexing unit 90 of the related technique uses the wavelength multiplexer 94 exhibiting a filter effect in order to avoid emission of a spectrum out of the hand. With such kind of wavelength multiplexer 94, loss is small in the channel band to be passed through whereas loss is large in other bands. Thus, the signals to be passed through can be multiplexed with small loss, and the spectrum of the other bands can be eliminated.

As described, in the wavelength multiplexer 94, the bands of the ports 951 to 95n are fixed to the bands of the signal lights 911 to 91n from the transmitters 921 to 92n on one-on-one basis. That is, the wavelength multiplexer 94 includes a built-in bandpass filter having different bands for each of the ports 951 to 95n. This kind of wavelength multiplexer 94 may sometimes be called as a "wavelength selective type".

Hereinafter, Patent Documents will be described.

Japanese Unexamined Patent Publication 2008-227556 (Paragraphs 0027-0031, FIG. 2: Patent Document 1) discloses a wavelength multiplexer having a filter characteristic. Further, in Patent Document 1, a word "colorless" is used for indicating that, there are a plurality of wavelengths (though limited) that can be inputted from a given port of the wavelength multiplexer due to the filter characteristic. In the meantime, in this Specification, a word "colorless (i.e., true colorless)" is used to indicate that there is no limit in the wavelengths that can be inputted from a given port of the wavelength multiplexer (i.e., a wavelength multiplexer having no filter characteristic). Furthermore, Patent Document 1 discloses a device called an "interleaver" is used as a 2-to-1 wavelength multiplexer.

Japanese Unexamined Patent Publication 2001-296418 (FIG. 10, FIG. 12: Patent Document 2) discloses about an optical fiber Bragg grating (FBG).

Japanese Unexamined Patent Publication 2010-054624 (FIG. 7, FIG. 9, FIG. 22, FIG. 24, FIG. 34: Patent Document 3) discloses a wavelength tunable filter which heats AWG (Arrayed Waveguide Grating), Mach-Zehnder interferometer, or a ring resonator with a heater.

Japanese Patent No. 2874439 (FIG. 1: Patent Document 4) discloses a wavelength tunable filter using a dielectric multilayer film.

Japanese Unexamined Patent Publication 2002-122747 (Paragraph 0066, FIG. 1: Patent Document 5) discloses a grating component in which a plurality of kinds of gratings of different reflection wavelengths are formed in series in the length direction of optical fibers.

In a case where the transmitters 921 to 92n are of the wavelength fixed type, the number of models thereof becomes enormous. Thus, management thereof becomes complicated. In the meantime, when the transmitters 921 to 92n are of the wavelength tunable type, the variation of models can be reduced since the output wavelength can be set arbitrarily according to commands. Therefore, it is possible to overcome the issue of managing the variations.

However, even though the wavelengths of the wavelength tunable type transmitters 921 to 92n can be changed remotely, connections between the transmitters 921 to 92n and the wavelength multiplexer 94 cannot be remotely switched. Therefore, an operator needs to switch the connections manually (see a virtual line 96). This is because the ports 951 to 95n and the passing wavelengths are fixedly related in the wavelength multiplexer 94.

In order to overcome such issue, there is considered a technique which switches connections by using a large-scaled optical matrix switch. However, this technique is unpractical since the structure of the large-scaled optical matrix switch is complicated and costly even though the wavelength multiplexer 94 can be utilized as it is.

It is therefore an exemplary object of the present invention to provide a wavelength multiplexing unit and a wavelength multiplexing method of a wavelength multiplexing optical transmission system which can connect a wavelength tunable transmitter and a wavelength multiplexer remotely with a simple structure, when changing the wavelength of the wavelength tunable transmitter remotely.

SUMMARY OF THE INVENTION

A wavelength multiplexing unit of a wavelength multiplexing optical transmission system according to the present invention includes: a plurality of transmitters having functions of outputting signal lights of different wavelengths from each other and changing the wavelengths; a plurality of band-limiting filters provided to each of those transmitters, which have functions of eliminating light out of assigned bands from the signal lights outputted from the transmitters and changing center wavelengths of the bands; and a wavelength multiplexer including a plurality of ports capable of inputting lights of any wavelengths to be the targets of wavelength multiplexing, which inputs a plurality of signal lights from which the light out of the bands are eliminated by the plurality of band-limiting filters via the plurality of ports, respectively, and multiplexes those signal lights.

A wavelength multiplexing method according to the present invention includes: outputting signal lights of different wavelengths from each other from a plurality of transmitters having a function of changing the wavelengths; eliminating light out of bands from the signal lights outputted from the transmitters by a plurality of band-limiting filters which are provided to each of the transmitters and have a function of changing center wavelengths of the bands; and inputting the plurality of signal lights from which the light out of the bands are eliminated by the plurality of band-limiting filters at a wavelength multiplexer including a plurality of ports capable of inputting lights of any wavelengths to be the targets of wavelength multiplexing via the plurality of ports, respectively, and multiplexing those signal lights.

BRIEF DESCRIPTION OF THE DRAWINGS

FIGS. 3A-3C are block diagrams showing further specific examples of the band-limiting filter shown in FIG. 2, in which FIG. 3A is a case of using an optical fiber Bragg grating (referred to as "FBG (Fiber Bragg Grating)" hereinafter, FIG. 3B is a case of using a Mach-Zehnder Interferometer (referred to as MZI) hereinafter, and FIG. 3C is a case of using a ring resonator;

FIGS. 4A and 4B show graphs of signal light spectrums before and after limiting the band with the band-limiting filter shown in FIG. 1, in which FIG. 4A is a case before limiting the band, and FIG. 4B is a case after limiting the band;

FIGS. 5A and 5B show illustrations regarding a band-limiting filter according to a second exemplary embodiment, in which FIG. 5A is a schematic illustration of FBG, and FIG. 5B is a graph showing the filter characteristic thereof;

FIGS. 7A-7C show illustrations regarding a band-limiting filter according to a third exemplary embodiment, in which FIG. 7A is a schematic illustration showing an interleaver, FIG. 7B is a graph showing an example of the filter characteristic thereof, and FIG. 7C is a schematic illustration showing a case of using the interleaver and an optical switch.

DETAILED DESCRIPTION OF THE PREFERRED EMBODIMENTS

Hereinafter, best modes for embodying the present invention (referred to as exemplary embodiments hereinafter) will be described by referring to the accompanying drawings.
(First Exemplary Embodiment)

Figure 1:
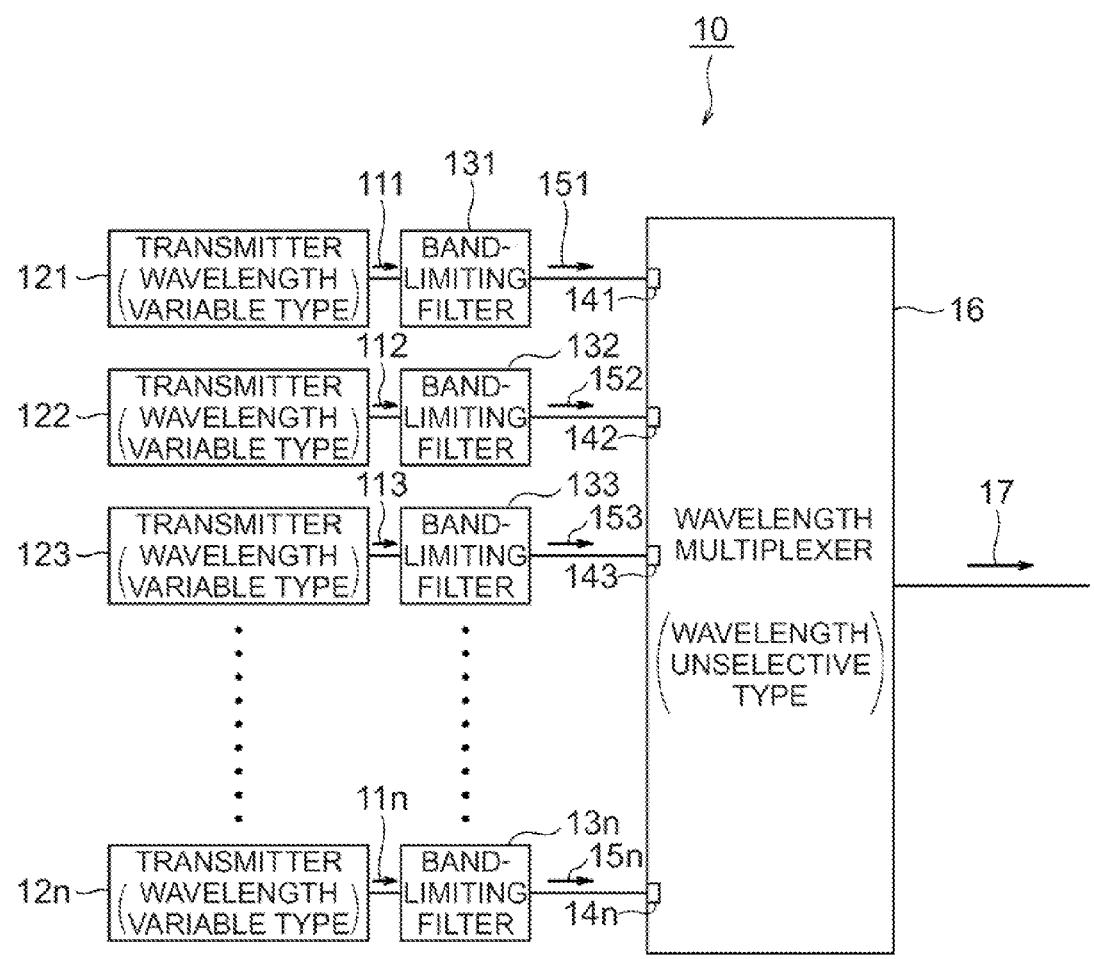
FIG. 1 is a block diagram showing a wavelength multiplexing unit of a wavelength multiplexing optical transmission system according to a first exemplary embodiment.
Figure 2:
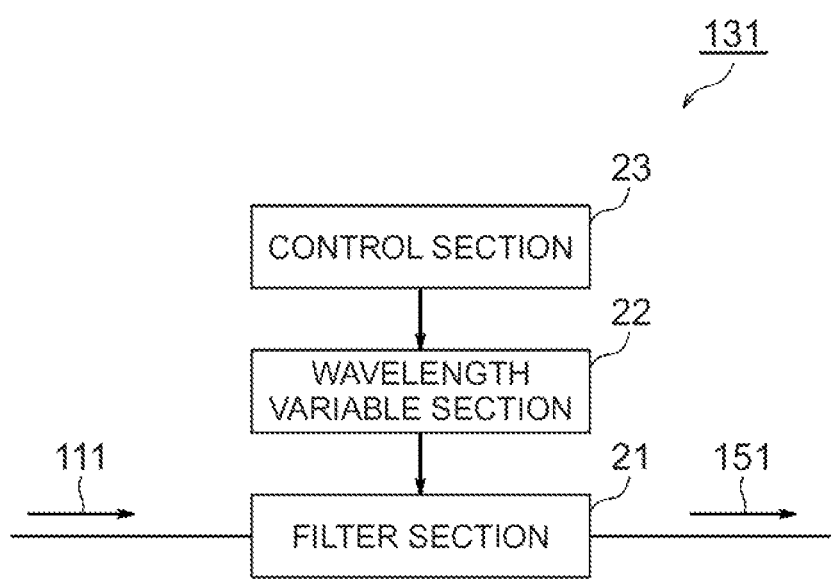
FIG. 2 is a block diagram showing an example of a band-limiting filter shown in FIG. 1.

FIG. 1 is a block diagram showing a wavelength multiplexing unit of a wavelength multiplexing optical transmission system according to a first exemplary embodiment. FIG. 2 is a block diagram showing an example of a band-limiting filter shown in FIG. 1. FIG. 3 shows block diagrams of more specific examples of the band-limiting filter shown in FIG. 2. Hereinafter, explanations will be provided by referring to the accompanying drawings.

The wavelength multiplexing unit 10 of the wavelength multiplexing optical transmission system according to the first exemplary embodiment includes: transmitters 121 to 12n having functions of outputting signal lights 111 to 11n of different wavelengths from each other and changing the wavelengths; the band-limiting filters 131 to 13n provided to each of the transmitters 121 to 12n, which have functions of eliminating the light out of bands from the signal lights 111 to 11n outputted from the transmitters 121 to 12n, and changing the center wavelengths of the bands; and the wavelength multiplexer 16 including ports 141 to 14n capable of inputting the lights of any wavelengths to be the targets of wavelength multiplexing, which inputs the signal lights 151 to 15n from which the lights out of the bands is eliminated by the band-limiting filters 131 to 131n and multiplexes the signal lights 151 to 15n via the ports 141 to 14n.

The transmitters 121 to 12n are constituted with a typical structure, and are connected to the ports 141 to 14n of the wavelength multiplexer 16, respectively. The wavelength multiplexer 16 is a passive star coupler, for example, which multiplexes the signal lights 151 to 15n and outputs wavelength multiplexed light 17. In other words, the transmitters 121 to 12n are of wavelength tunable type, and the band-limiting filters 131 to 13n are center wavelength tunable bandpass filters.

FIG. 2 shows an example of the band-limiting filter 131. The band-limiting filter 131 includes: a filter section 21 which eliminates light out of the band from the signal light 111; a wavelength tunable section 22 which changes the center wavelength of the band of the filter section 21; and a control section 23 which controls the wavelength tunable section 22 so that the center wavelength of the band becomes a set value. The other band-limiting filters 132 to 13n are also in the same structure as that of the band-limiting filter 131 (same hereinafter).

The filter section 21 may be defined to have a multi-peak filter characteristic which eliminates the light out of each of a plurality of bands. In other words, the filter section 21 may be defined to have a filter characteristic with which a filter characteristic of a same shape appears repeatedly on a frequency axis, and structured to be wavelength tunable by changing the entire offset.

As the filter section 21, it is possible to use a type that has such a characteristic that the center wavelength of the band changes by the temperatures. In that case, as the wavelength tunable section 22, it is possible to use a heater for heating the filtering section 21. Further, as the control section 23, it is possible to use a temperature controller which supplies power to the wavelength tunable section 22 (heater) so that the filter section 21 turns to the temperature corresponding to the set value of the center wavelength.

Figure 3A:
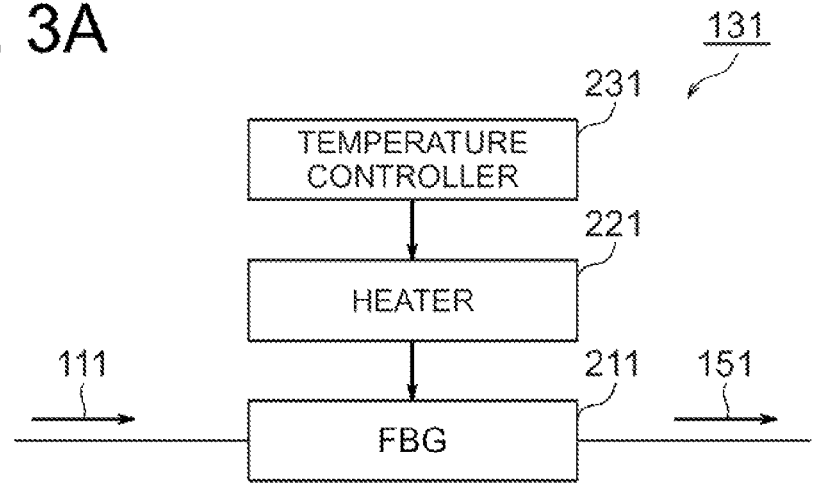
Figure 3B:
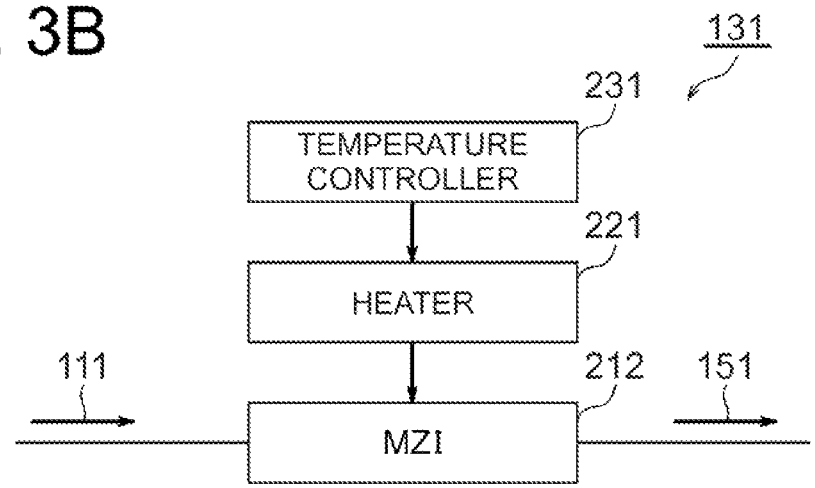
Figure 3C:
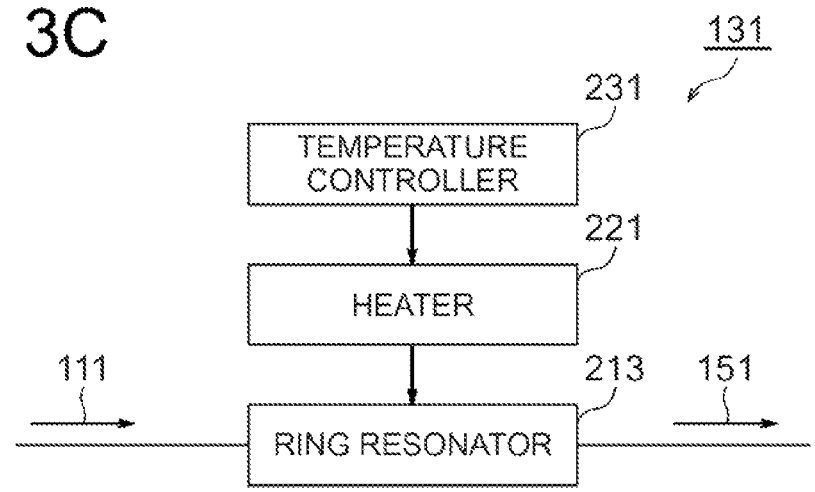

As the filter section 21 having a characteristic with which the center wavelength of the hand changes by the temperatures, it is possible to use FBG, MZI, or a ring resonator formed as a planar lightwave circuit (referred to as "PLC (Planar Lightwave Circuit)" hereinafter), for example. FIGS. 3A-3C show cases of the band-limiting filter 131 using those. FIG. 3A is a case of using an FBG 211, FIG. 3B is a case of using an MZI 212, and FIG. 3C is a case of using, a ring resonator 213. Further, a heater 221 and a temperature controller 231 are used in common to each of those cases. The heater 221 is a thin film heater, for example. The temperature controller 231 includes a microcomputer, for example, stores the relation between the center wavelength of the band and the power supplied to the heater 221 in a table, and executes an open control or a feedback control according to the inputted set value. The temperature controller 231 which executes the feedback control also includes a temperature sensor which measures the temperatures of the FBG 211, and the like.

In other words, other than the FBG 211, as the devices showing the BPF characteristic close to a rectangular shape (see FIG. 4B), there are the multiple-stage MZI 212 and the ring resonator 213 mounted into PLC which uses a Silica ($SiO_2$) waveguide and a silicon waveguide. In a case of PLC, it is common to use a thermooptic effect (an effect where the refractive index changes depending on the temperatures) by the heater 221 and the like as a method for changing the center wavelength of the band.

Figure 4A:
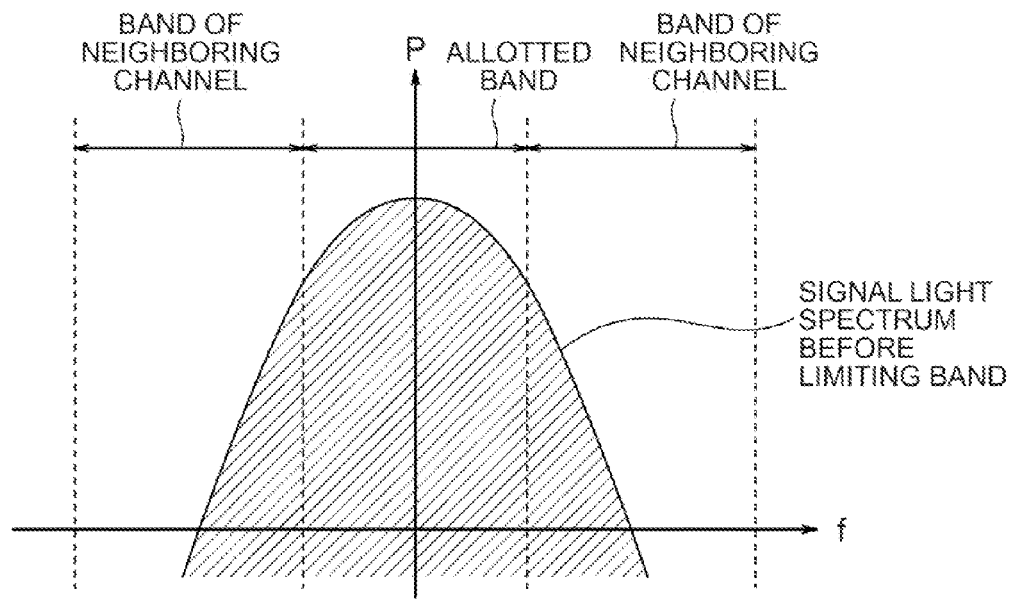
Figure 4B:
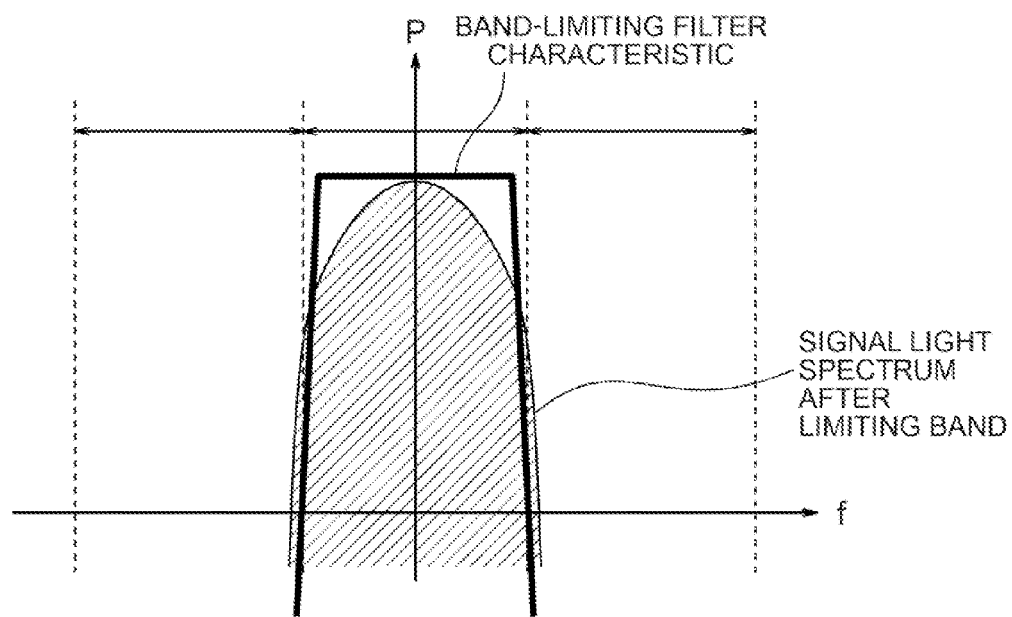

FIGS. 4A and 4B show graphs of signal light spectrums before and after limiting the band with the band-limiting filter, in which FIG. 4A is a case before limiting the band, and FIG. 4B is a case after limiting the band. In FIG. 4, the horizontal axis f is the frequency (i.e., reciprocal of wavelength), and the vertical axis P is the power of signal light (same in other graphs). Hereinafter, operations and effects of the wavelength multiplexing unit 10 will be described by referring to FIG. 1 to FIG. 4.

For example, light out of the band is eliminated from the signal light 111 outputted from the transmitter 121 (see FIG. 4A) by the band-limiting filter 131. The signal light 151 (see FIG. 4B) outputted from the band-limiting filter 131 (see FIG. 4B) is inputted to the port 141, and multiplexed with the other signal lights 151 to 15n in the wavelength multiplexer 16. It is assumed here that the wavelength of the transmitter 121 is changed remotely. Thereby, the transmitter 121 can be used while being connected to the port 141 through changing the band of the band-liming filter 131 remotely. This is because the band of the band-limiting filter 131 can be adjusted to the changed band of the wavelength of the transmitter 121, and the port 141 is capable of inputting the light of any wavelengths. Therefore, it is unnecessary to reconnect the transmitter 121 manually.

The wavelength multiplexing unit 10 makes it possible to change the wavelengths of the transmitters 121 to 12n remotely and to connect the transmitters 121 to 12n with the wavelength multiplexer 16 remotely with a simple structure and at a low cost through providing the band-limiting filters 131 to 13n between the transmitters 121 to 12n and the wavelength multiplexer 16. The reason for enabling a simple structure is that it is possible to use the simple and wavelength nondependant wavelength multiplexer 16 without using a large-scaled optical matrix switch.

Next, a wavelength multiplexing method according to the first exemplary embodiment will be described.

The wavelength multiplexing method of the first exemplary embodiment is the operation of the wavelength multiplexing unit 10 taken as an invention of a method, which includes following procedures. First, the transmitters 121 to 12n having a function of changing the wavelengths output the signal lights 111 to 11n of different wavelengths from each other. Subsequently, the band-limiting filters 131 to 13n having a function of changing the center wavelengths of the bands provided to the respective transmitters 121 to 12n eliminate the light out of the bands from the signal lights 111 to 11n outputted from the transmitters 121 to 12n. At last, the wavelength multiplexer 16 having the ports 141 to 14n capable of inputting the light of any wavelength to be the targets of wavelength multiplexing inputs the signal lights 151 to 15n from which the light out of the bands is eliminated by the band-limiting filters 131 to 13n via the ports 141 to 14n, respectively, and multiplexes those signal lights 151 to 15n. The same operations and effects as those of the wavelength multiplexing unit 10 can be achieved also by the wavelength multiplexing method of the first exemplary embodiment.

Next, the first exemplary embodiment will be described in more details.

The use of the wavelength multiplexers having no wavelength selectivity, simply, the use of passive star couplers, has been avoided before, since the loss is big. However, it is considered practical nowadays where optical amplifiers have come to become inexpensive. Such wavelength nondependant type wavelength multiplexer is called a colorless wavelength multiplexer. When a spectrum out of an assigned band is contained in light outputted from the transmitter in a case of using the colorless wavelength multiplexer, such spectrum is not eliminated by the wavelength multiplexer. This causes an interference disturbance. In the meantime, with current technologies in optical communication, still higher spectral efficiency is required in order to satisfy the demands for increases in the capacity and speed. As a result, the assigned hand needs to be used widely to the utmost. Therefore, leak light to neighboring channels in particular is likely to be generated, and the importance of overcoming such issue is increasing.

Thus, the wavelength multiplexing unit 10 according to the first exemplary embodiment includes the band-limiting filters 131 to 13n between the transmitters 121 to 12n and the wavelength multiplexer 16. That is, it is important to let the signal lights 111 to 11n go through the band-limiting filters 131 to 13n before wavelength-multiplexing the signal lights 111 to 11n in the transmitting section using the colorless wavelength multiplexer 16. Namely, it is important to perform filtering before multiplexing. Because, when reproducing the function performed by the wavelength multiplexer having a filter characteristic disclosed in Patent Document 1 by separating filtering and multiplexing functions, the above-described processing order is required. In other words, the wavelength multiplexing unit 10 using the transmitters 121 to 12n is characterized to include the band-limiting filters 131 to 13n at a pre-stage of multiplexing the wavelengths (frequencies) to narrow the bands of the signal lights 111 to 11n by the band-limiting filters 131 to 13n.

The first exemplary embodiment makes it possible to prevent the light of wavelength not allotted to the wavelength channel originally from contained in the signal lights 151 to 15n outputted from the transmitters 121 to 12n and arrived at the wavelength multiplexer 16, when using wavelength nondependant wavelength multiplexer 16. Thereby, practical value of the colorless wavelength multiplexer 16 of no wavelength selectivity can be improved greatly.

As an exemplary advantage according to the present invention, the present invention is capable of preventing mixture of unnecessary light that is not supposed to be flown into a given wavelength channel, i.e., an issue to be overcome when using a wavelength multiplexing unit acquired by multiplexing a wavelength tunable type optical transmitter and a wavelength nondependant type wavelength multiplexer, which is advantageous in terms of the material cost, the operation management cost, and the simplicity of the structure. This makes it possible to enjoy the merits of the wavelength multiplexing unit fully.

(Second Exemplary Embodiment)

Figure 5A:
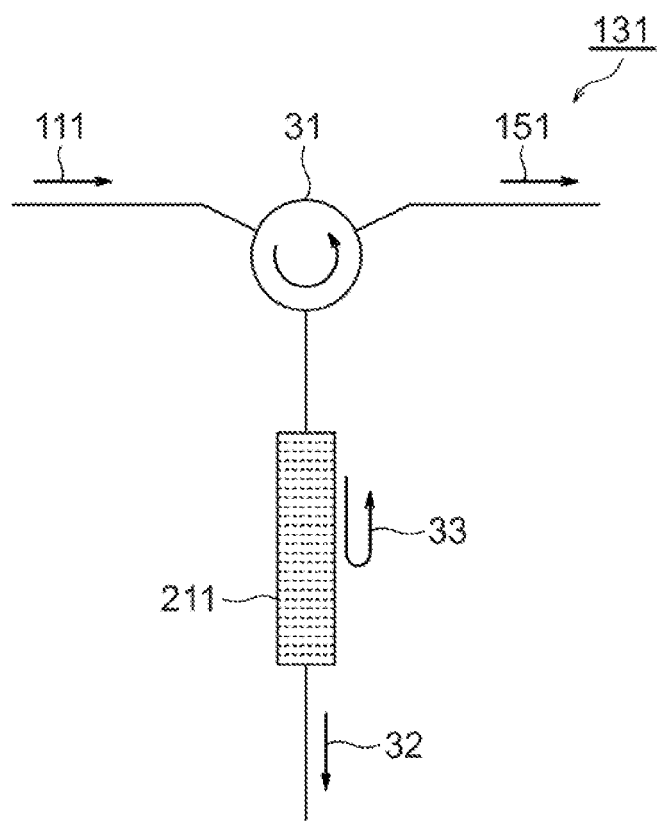
Figure 5B:
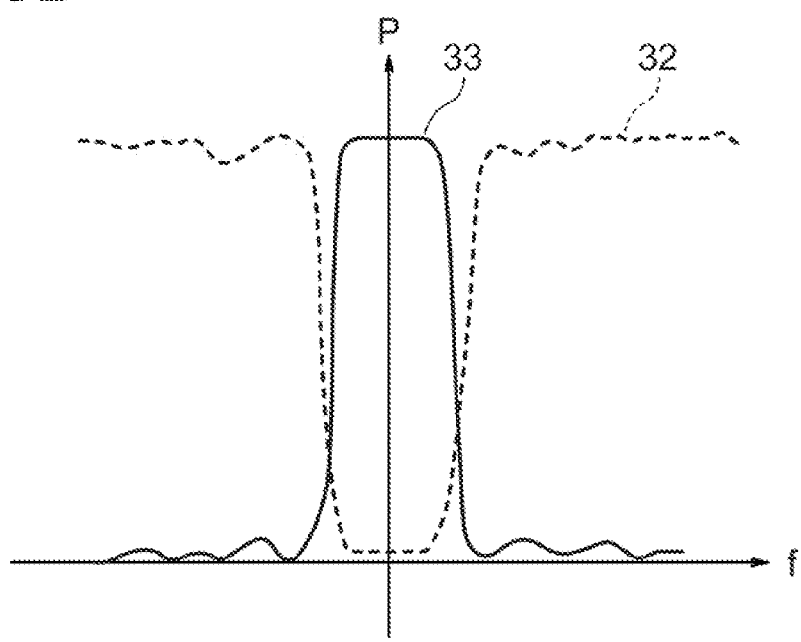
Figure 6:
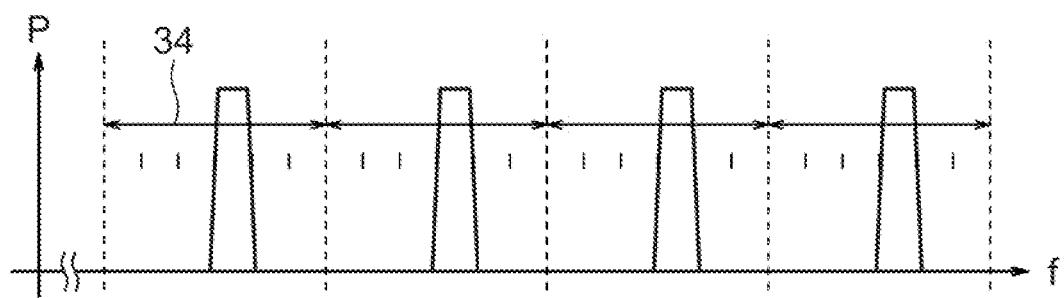
FIG. 6 is a graph showing a multi-peak filter characteristic of FBG according to the second exemplary embodiment.

FIGS. 5A and 5B show illustrations regarding a band-limiting filter according to a second exemplary embodiment, in which FIG. 5A is a schematic illustration of FBG, and FIG. 5B is a graph showing the filter characteristic thereof. FIG. 6 is a graph showing a multi-peak filter characteristic of FBG according to the second exemplary embodiment. Hereinafter, explanations will be provided by referring to those drawings.

The second exemplary embodiment is characterized to use an FBG 211 for the band-limiting filter 131. Other than the FBG 211, the band-limiting filter 131 includes a heater 221 and a temperature controller 231 shown in FIG. 3A, for example, in addition to an optical circulator 31. The FBG 211 is a diffraction grating formed by generating a periodical refractive index change along the longitudinal direction of an optical fiber by changing the refractive index through irradiating an ultraviolet ray to a core part of the optical fiber where germanium or the like is doped. The FBG 211 has a characteristic of reflecting light of a specific wavelength (band) and transmitting other light. As shown in FIG. 5B, the filter characteristic of the FBG 211 for reflection light 33 is almost rectangular, and it is close to the ideal as BPF. Thus, as shown in FIG. 5A, the optical circulator 31 is combined with the FBG 211 to utilize the reflection light 33 of the FBG 211. With the structure shown in FIG. 5A, following relational expressions apply.

Signal light 111=Transmission light 32+Reflection light 33

Signal light 151=Reflection light 33

The FBG 211 in terms of the filter characteristic shown in FIG. 5B exhibits a single-peak characteristic. However, as shown in FIG. 6, it is also possible to achieve a multi-peak filter characteristic in which a plurality of filters are superimposed and synthesized. The FBG 211 having the multi-peak filter characteristic is so formed that a same filter characteristic form (referred to as "individual filter curve" hereinafter) appears repeatedly on a frequency axis.

Further, the FBG 211 can change the center wavelength by changing the period of the refractive index change, i.e., the pitch of the diffraction gating. As an effect for causing the change, used are temperatures, stresses (tension stress, bending stress), and the like. Through inserting the band-limiting filter 131 using the FBG 211 on the output side of the wavelength tunable transmitter, the basic part of the exemplary object of the present invention, i.e., to eliminate the light leaked to the outside the band, can be achieved.

The wavelength tunable range of the wavelength tunable transmitters that are typically available on the market nowadays is about 40 nm. This is due to the fact that the amplifying band of the optical amplifier is about 40 nm. Meanwhile, the wavelength tunable range of FBG by the temperatures, tensions, and the like is only about 10 nm at the utmost. In such case, the required wavelength tunable range per filter curve may be narrowed by using the FBG 211 having a multi-peak filter characteristic. Such use example is shown in FIG. 6. FIG. 6 shows a state where the center wavelength is changed by an effect of temperatures or stress (tension) for the FBG 211 having a multi-peak filter characteristic. In FIG. 6, arrow 34 (←→) is a wavelength tunable range per a filter curve.

Other structures of the second exemplary embodiment are the same as those of the first exemplary embodiment. The second exemplary embodiment can also achieve the same operations and effects as those of the first exemplary embodiment.

(Third Exemplary Embodiment)

Figure 7A:
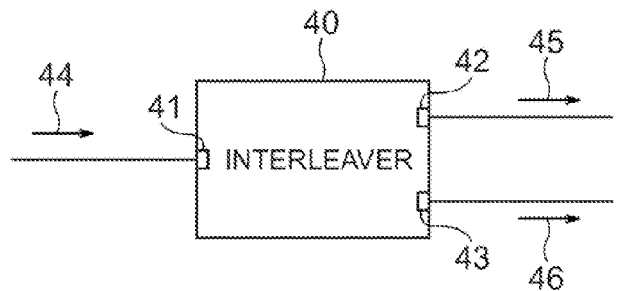
Figure 7B:
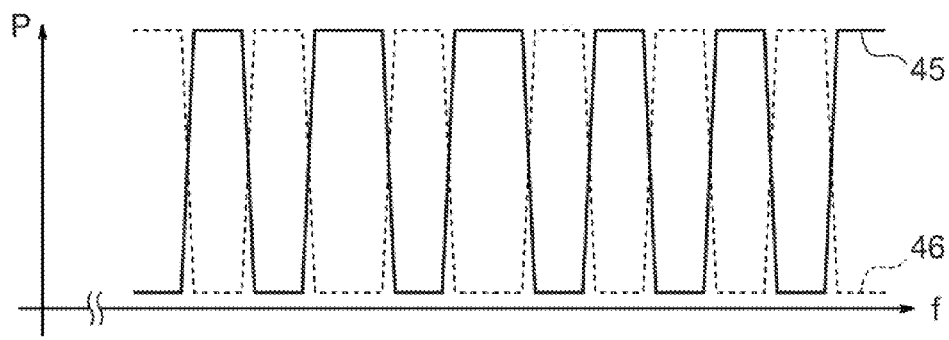
Figure 7C:
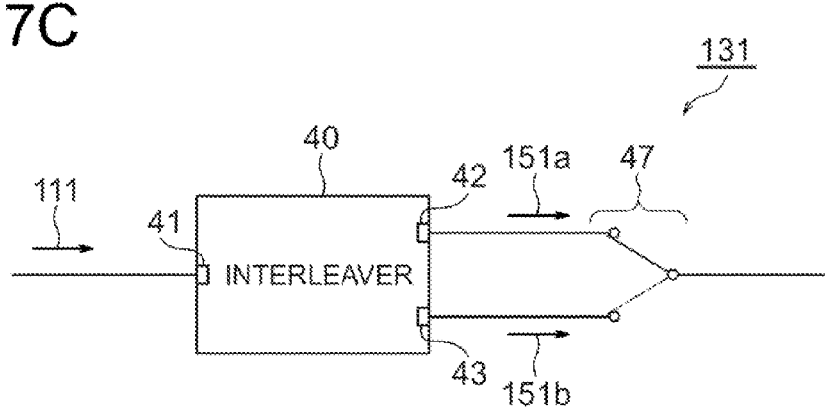
Figure 8:
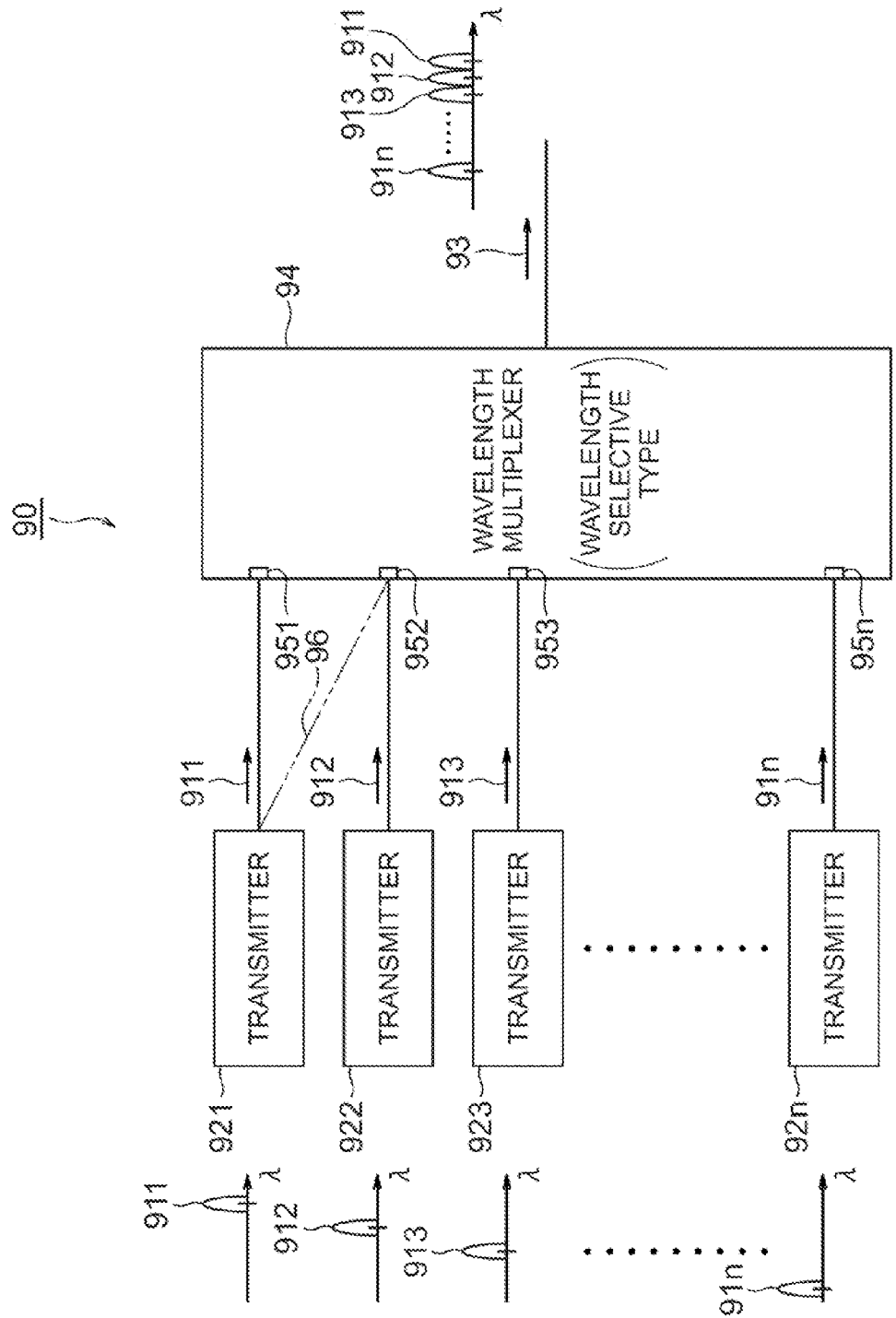
FIG. 8 is a block diagram showing a wavelength multiplexing unit of a wavelength multiplexing optical transmission system according to a related technique.

FIGS. 7A-7B show illustrations regarding a band-limiting filter according to a third exemplary embodiment, in which FIG. 7A is a schematic illustration showing an interleaver, FIG. 7B is a graph showing an example of the filter characteristic thereof, and FIG. 7C is a schematic illustration showing a case of using the interleaver and an optical switch. Hereinafter, explanations will be provided by referring to those drawings.

As shown in FIG. 7C, the third exemplary embodiment is characterized to use an interleaver 40 for the band-limiting filter 131. As a practical use example of the filter constituted with a multiple-stage MZI, the interleaver 40 shown in FIG. 7A is well known. The interleaver 40 includes a single input port 41 and two output ports 42, 43. Light 44 is inputted to the input port 41, and outputted from either one of the output ports 42, 43 depending on the wavelength thereof. The relation between light 45 outputted from the output port 42 and light 46 outputted from the output port 43 is as shown in FIG. 7B. That is, the interleaver 40 has a filter 1characteristic in which a multi-peak filter characteristic is arranged alternately.

The interleaver 40 has such periodic filter characteristic, so that it can be utilized as the band-limiting filter 131 as in the case of FBG having the multi-peak filter characteristic described above. To use it as the band-limiting filter 131, it is possible to employ a structure which combines the interleaver 40 with an optical switch 47 and selects either one of signal lights 151a, 151b as shown in FIG. 7C, for example. In this case, the main body that controls the optical switch 47 is the control section 23 shown in FIG. 2, for example. Further, it is also possible to employ a structure which fixedly selects either one of the signal lights 151a, 151b without providing the optical switch 47. Other than the interleaver 40, the band-limiting filter 131 includes a heater 221 and a temperature controller 231 shown in FIG. 3B, for example.

In the structure of FIG. 7C, it is also possible to employ a structure which does not change the center wavelength of they band but simply selects either one of the signal lights 151a, 151b without controlling the temperature.

The filter characteristic of the multiple-stage MZI is not limited to a shape in which the filter characteristics of two ports overlap with each other alternately when the wavelength is shifted as in the case of interleaver. For example, it is possible to design the shape by cascading multi-stage configuration, such as the one shown in FIG. 6, for example. As the multiple-stage interference type filter, a multiple-stage ring resonator is also known in addition to MZI. It is also possible with the multiple-stage ring resonator to achieve the same band-limiting filter by considering the design.

Other structures of the third exemplary embodiment are the same as those of the first and second exemplary embodiments. The third exemplary embodiment can also achieve the same operations and effects as those of the first and second exemplary embodiments.

Next, outlines of another exemplary embodiment will be described.

As the band-limiting filter used in the present invention, it is also possible to use a dielectric multilayer film filter that is the most widely used as the optical filter. However, in general, the base of the filter characteristic of the dielectric multilayer film filter is wide, so that a sophisticated designing/manufacturing technique is required for enabling elimination of light leaked to the neighboring channels. In addition, in general, it is difficult with the dielectric multilayer film filter to change the center wavelength. Particularly, it is extremely difficult to satisfy the two demands simultaneously. Thus, the dielectric multilayer film filter can be applied when it is sufficient to have narrow wavelength tunable range or when the main component of leak light is not the wavelength of near the neighboring channel but the wavelength far from the neighboring channel.

The inserting position of the band-limiting filter used in the present invention may be at any positions between the wavelength tunable transmitter and the wavelength multiplexer. However, it is desirable to be unified by being implemented with the wavelength tunable transmitter in view of the fact that it is necessary to perform control to adjust the output wavelength of the wavelength tunable transmitter and the center wavelength of the band-limiting filter. While the heater is used as the wavelength tunable section as a way of example, it is also possible to use a Peltier element, for example, instead of the heater or along with the heater.

While the present invention has been described above by referring to each of the exemplary embodiments, the present invention is not limited only to each of those exemplary embodiments. Various changes and modifications occurred to those skilled in the art can be applied to the structures and details of the present invention. Further, the present invention includes combinations of a part of or a whole part of the structures of each of the above-described embodiments.

A part or a whole part of the exemplary embodiments can be depicted as follows. However, it is to be noted that the present invention is not limited only to the structures described below.

(Supplementary Note 1)

A wavelength multiplexing unit of a wavelength multiplexing optical transmission system which includes: a plurality of transmitters having functions of outputting signal lights of different wavelengths from each other and changing the wavelengths; a plurality of band-limiting filters provided to each of those transmitters, which have functions of eliminating light out of assigned bands from the signal lights outputted from the transmitters and changing center wavelengths of the bands; and a wavelength multiplexer including a plurality of ports capable of inputting lights of any wavelengths to be targets of wavelength multiplexing, which inputs a plurality of signal lights from which the light out of the bands are eliminated by the plurality of band-limiting filters via the plurality of ports, respectively, and multiplexes those signal lights.

(Supplementary Note 2)

The wavelength multiplexing unit of the wavelength multiplexing optical transmission system depicted in Supplementary Note 1, wherein the band-limiting filter includes: a filter section which eliminates the light out of the band from the signal light; a wavelength tunable section which changes the band of the filter section; and a control section which controls the wavelength tunable section so that the center wavelength of the band turns to a set value.

(Supplementary Note 3)

The wavelength multiplexing unit of the wavelength multiplexing optical transmission system depicted in Supplementary Note 2, wherein the filter section has a multi-peak filter characteristic which eliminates light out of each of the bands for the plurality of bands.

(Supplementary Note 4)

The wavelength multiplexing unit of the wavelength multiplexing optical transmission system depicted in Supplementary Note 2 or 3, wherein: the filtering section has such a characteristic that the center wavelength changes by temperatures; the wavelength tunable section is a heater which heats the filtering section; and the control section is a temperature controller which supplies power to the heater so that the filtering section turns to a temperature corresponding to the set value of the center wavelength.

(Supplementary Note 5)

The wavelength multiplexing unit of the wavelength multiplexing optical transmission system depicted in any one of Supplementary Notes 2 to 4, wherein the filter section is an optical fiber Bragg grating.

(Supplementary Note 6)

The wavelength multiplexing unit of the wavelength multiplexing optical transmission system depicted in any one of Supplementary Notes 2 to 4, wherein the filter section is a Mach-Zehnder interferometer.

(Supplementary Note 7)

The wavelength multiplexing unit of the wavelength multiplexing optical transmission system depicted in any one of Supplementary Notes 2 to 4, wherein the filter section is a ring resonator.

(Supplementary Note 8)

The wavelength multiplexing unit of the wavelength multiplexing optical transmission system depicted in any one of Supplementary Notes 2 to 4, wherein the filter section is an interleaver.

(Supplementary Note 9)

The wavelength multiplexing unit of the wavelength multiplexing optical transmission system depicted in any one of Supplementary Notes 1 to 8, wherein the wavelength multiplexer is an optical coupler (e.g., star coupler) that is designed to have a small wavelength dependency.

(Supplementary Note 10)

A wavelength multiplexing method which includes: outputting signal lights of different wavelengths from each other from a plurality of transmitters having a function of changing the wavelengths; eliminating light out of bands from the signal lights outputted from the transmitters by a plurality of band-limiting filters which are provided to each of the transmitters and have a function of changing center wavelengths of the bands; and inputting the plurality of signal lights from which the light out of the bands are eliminated by the plurality of band-limiting filters at a wavelength multiplexer including a plurality of ports capable of inputting lights of any wavelengths to be targets of wavelength multiplexing via the plurality of ports, respectively, and multiplexing those signal lights.

(Supplementary Note 11)

A wavelength multiplexing unit of a wavelength multiplexing optical transmission system which includes: a plurality of transmitters having functions of outputting signal lights of different wavelengths from each other and changing the wavelengths; a plurality of band-limiting filters provided to each of those transmitters, which have functions of eliminating light out of bands from the signal lights outputted from the transmitters and changing center wavelengths of the bands; and a wavelength multiplexer including no band-limiting filter, which inputs a plurality of signal lights from which the light out of the bands are eliminated by the plurality of band-limiting filters via a plurality of ports, respectively, and multiplexes those signal lights.

(Supplementary Note 12)

A wavelength multiplexing method which includes: outputting signal lights of different wavelengths from each other from a plurality of transmitters having a function of changing the wavelengths; eliminating light out of bands from the signal lights outputted from the transmitters by a plurality of band-limiting filters provided to each of the transmitters, which have a function of changing center wavelengths of the bands; and inputting the plurality of signal lights from which the light out of the bands are eliminated by a wavelength multiplexer including no band-limiting filter via a plurality of ports, respectively, and multiplexing those signal lights.

INDUSTRIAL APPLICABILITY

The present invention can be utilized for optical communications and the like using wavelength multiplexing technique and wavelength tunable transmitters.

What is claimed is:

1. A wavelength multiplexing unit of a wavelength multiplexing optical transmission system which includes: a plurality of transmitters having functions of outputting signal lights of different wavelengths from each other and changing the wavelengths; a plurality of band-limiting filters provided to each of those transmitters, which have functions of eliminating light out of assigned bands from the signal lights outputted from the transmitters and changing center wavelengths of the bands; and a wavelength multiplexer including a plurality of ports capable of inputting lights of any wavelengths to be targets of wavelength multiplexing, which inputs a plurality of signal lights from which the light out of the bands are eliminated by the plurality of band-limiting filters via the plurality of ports, respectively, and multiplexes those signal lights.

2. The wavelength multiplexing unit of the wavelength multiplexing optical transmission system claimed in claim 1, wherein the band-limiting filter section has a multi-peak filter characteristic which eliminates light out of each of the bands for the plurality of bands.

3. The wavelength multiplexing unit of the wavelength multiplexing optical transmission system claimed in claim 1, wherein the band-limiting filter section includes an optical fiber Bragg grating for eliminating light out of assigned bands from the signal lights.

4. The wavelength multiplexing unit of the wavelength multiplexing optical transmission system claimed in claim 1, wherein the band-limiting filter section includes a Mach-Zehnder interferometer for eliminating light out of assigned bands from the signal lights.

5. The wavelength multiplexing unit of the wavelength multiplexing optical transmission system claimed in claim 1, wherein the band-limiting filter section includes a ring resonator for eliminating light out of assigned bands from the signal lights.

6. The wavelength multiplexing unit of the wavelength multiplexing optical transmission system claimed in claim 1, wherein the band-limiting filter section includes an interleaver for eliminating light out of assigned bands from the signal lights.

7. The wavelength multiplexing unit of the wavelength multiplexing optical transmission system claimed in claim 1, wherein the wavelength multiplexer is an optical coupler including a plurality of ports capable of inputting lights of any wavelengths to be targets of wavelength multiplexing.

8. A wavelength multiplexing method which includes: outputting signal lights of different wavelengths from each other from a plurality of transmitters having a function of changing the wavelengths; eliminating light out of bands from the signal lights outputted from the transmitters by a plurality of band-limiting filters which are provided to each of the transmitters and have a function of changing center wavelengths of the bands; and inputting the plurality of signal lights from which the light out of the bands are eliminated by the plurality of band-limiting filters at a wavelength multiplexer including a plurality of ports capable of inputting lights of any wavelengths to be targets of wavelength multiplexing via the plurality of ports, respectively, and multiplexing those signal lights.

* * * * *